April 7, 1964 D. F. BUSCH 3,128,453

DRIVE RING

Filed Aug. 28, 1961

INVENTOR

DONALD F. BUSCH

BY Charles P. [signature] AGENT 3,128,453
Patented Apr. 7, 1964

3,128,453

DRIVE RING

Donald F. Busch, Vestal, N.Y., assignor to International Business Machines Corporation, New York, N.Y., a corporation of New York Filed Aug. 28, 1961, Ser. No. 134,531
1 Claim. (Cl. 340—174)

This invention relates to electromagnetic means for controlling extensive logical networks and more particularly to a drive ring for logical networks.

Current sources are frequently required for pulse circuits of computer systems and data processing systems and are particularly required as a driving medium for computer logic circuits utilizing magnetic cores.

Pulse generators are well known in the prior art and include those comprising a combination of oscillators serving as a pulse generating medium and arranged to operate in sequence; and those in which pulses are formed with the aid of artificial delay lines for establishing the pulse timing sequence; and those in which a reactance is first charged and then discharged through the load. Such pulse generators are capable of generating substantially rectangular pulses which, if applied to a resistive load, will cause substantially rectangular current pulses to flow. However, if the load contains magnetic cores, the voltage generated during resetting of the cores causes current to flow through the load even though the voltage of the pulse generator is returned to its zero state.

This invention contemplates circuitry which overcomes the disadvantages of conventional pulse generators and uses more efficient reliable switching mechanism that requires a minimum of external pulse control. Saturable magnetic elements are utilized to facilitate the switching problems.

It is an object of this invention to provide a driving ring which uses saturable magnetic elements as switching mechanism.

It is a further object of this invention to provide a current pulse from a relatively low voltage source.

It is a further object of this invention to provide a simplified pulse generator which contains relatively few components.

It is a still further object of this invention to provide a pulse source particularly adapted for driving magnetic core logic circuits.

It is still another object of this invention to provide a driving ring wherein the undriven loads are isolated by means of a high impedance.

Briefly, the invention comprises a ring of bistable magnetic cores interlinked in such a manner that a triggering pulse applied to the ring will start to switch the selected core which in turn renders an associated transistor conductive. Current flow through the transistor completes the switching of that core and in turn switches the next successively occurring core in the ring and delivers a pulse to the load. The ring is now in readiness for the next cyclically occurring trigger pulse which will activate the next succeeding stage of the drive ring. This arrangement provides a novel and inexpensive way of obtaining sequentially occurring drive pulses of sufficient power to sequence or drive magnetic core logic circuitry.

The foregoing and other objects, features and advantages of the invention will be apparent from the following more particular description of a preferred embodiment of the invention, as illustrated in the accompanying drawings.

Figure 2:
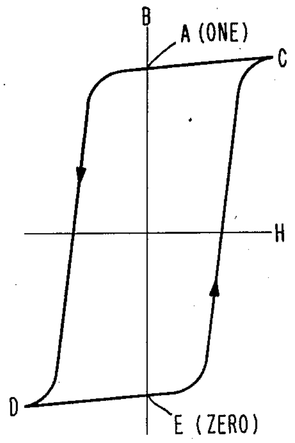
FIG. 2 is an idealized showing of the rectangular hysteresis loop characteristics of the magnetic cores of the type used in this invention.

The curve in FIG. 2 illustrates an idealized hystersis loop of commercially obtainable magnetic material. Points A and E are stable remanent states further adapted for representing binary information, and a core may be driven to either of these states by the application of a positive or negative magnetomotive force respectively. If the state of remanence of a core of such material is that indicated by the point A, application of a positive magnetomotive force greater than the coercive force causes it to traverse the hysteresis curve to point C and, upon relaxation of the positive force, revert to point A. Application of a negative magnetomotive force greater than the coercive force causes the curve to be traversed to point D, and when the force is terminated, traversed to point E. Similarly, when the remanence state of the core stands at point E, the application of a negative magnetomotive force causes the curve to be traversed to point D and returned to point E when the negative force is relaxed; while a positive force greater than the coercive force causes the traversal of the curve from point E to point C and return to point A when the positive force is terminated. The state of remanence indicated at point A on the curve is arbitrarily selected as representing a binary one and the state of remanance indicated at point E as a binary zero. In order to indicate how the turns of a winding are placed on a core, the dot convention is employed to indicate that current flowing out of a winding from a dot-marked end is arbitrarily assumed to produce a counterclockwise flux in the core. Stated otherwise, the core is switched in a positive direction. Current flowing into a winding at a dot-marked end then produces a clockwise flux in the core. Stated otherwise, the core is switched in a negative direction.

Figure 1:
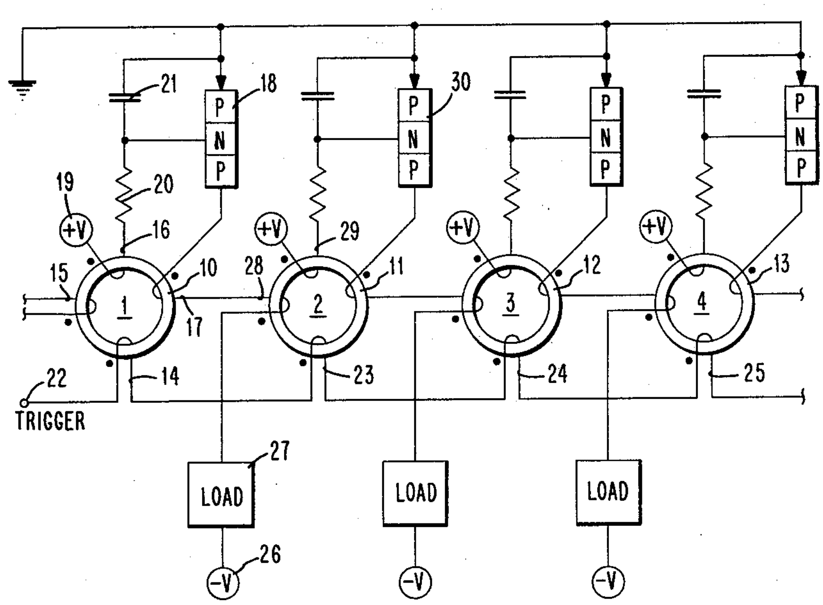
FIG. 1 is a schematic diagram of a four stage drive ring in accordance with the principles of the present invention.

Reference is made to FIG. 1 for a description of a magnetic core drive ring constructed according to the principles of the present invention. As shown, the drive ring has four stages comprising the cores 10, 11, 12, and 13. The first stage comprises the bistable magnetic core 10 having inductively coupled therewith a trigger winding 14, a set winding 15, a bias winding 16, an output winding 17, and a transistor 18. Each of the cores 11, 12, and 13 have a similar set of windings. For descriptive purposes and to show the operation of the drive ring we may arbitrarily assume core 10 to be in the "1" state and cores 11, 12, and 13 to be in the "0" state. The potential 19 connected in series with winding 16, resistor 20, capacitor 21 to ground serves through the connection with the base of transistor 18 to normally bias transistor 18 to its "off" or non-conductive state. A positive trigger pulse applied to terminal 22 will be applied to the serially connected trigger windings 14, 23, 24, and 25 for cores 10, 11, 12, and 13, respectively, tending to switch all cores to their reference or "0" state. Only the core 10 can switch since it is the only core in the "1" state. The switching of core 10 induces a current flow in the bias winding 16 which overcomes the bias potential and renders transistor 18 conductive.

A series circuit comprises the potential 26, load 27, set winding 28 on core 11, output winding 17 on core 10, and transistor 18. Transistor 18 in the conducitve state causes current to flow through this circuit. The current flow through the output winding 17 is in such a direction as to aid in the switching of core 10 to its "0" state and replaces the relatively shorter trigger pulse for effecting the switching operation of core 10. The current flow in this circuit and through set winding 28 is in such a direction as to switch core 11 from its reference or "0" state to its "1" state. The current flow in this circuit also functions as a drive pulse to load 27. As the core 11 switches to its "1" state, the potential developed in the bias winding 29 adds to the bias potential for maintaining transistor 30 in its non-conductive condition. After core 10 has switched to its "0" state, no current will be induced in winding 16 and transistor 18 will be biased to its non-conductive condition.

Recapitulating, the output current pulse of core 10 serves to complete the switching of core 10 from a "1" to a "0" state, to switch core 11 from the "0" state to the "1" state, and provide a drive pulse to load 27.

The next trigger pulse applied to terminal 22 will switch core 11 to the "0" state and set core 12 to the "1" state in the same manner as described above. Thus, there has been provided a drive ring circuit which may be used to drive a plurality of loads sequentially in synchronism with a series of timing pulses. The drive ring can be connected as a closed ring wherein the switching of the last core from a "1" to "0" state causes the first core in the ring to be set to a "1" state, the ring thus serving to deliver a sequence of pulses repetitively. Also the ring can be connected as an open ring wherein at the conclusion of a sequence of pulses the first core in the ring must be reset to a "1" state by external means before the next sequence of pulses can begin. This latter type of operation permits starting a series of pulses with any desired delay after the previous series of pulses.

A basic advantage of the drive ring circuit herein disclosed is the simplicity of the circuit and the resulting low cost. A large number of timing, drive, and sequencing circuits are required to perform the above disclosed functions with most of the presently known techniques. In the unique arrangement herein disclosed the only controls required consist of a low energy timing pulse. The characteristics of the drive ring itself determines the pulse width of the drive pulse. A further advantage of the drive ring is that the undriven loads are isolated by the high impedance of a transistor in its non-conductive condition. The drive ring is particularly adapted for driving loads comprising magnetic core logic circuits and can be conveniently switched without resulting back circuit currents.

While the invention has been particularly shown and described with reference to a preferred embodiment thereof, it will be understood by those skilled in the art that various changes in form and details may be made therein without departing from the spirit and scope of the invention.

What is claimed is:

Apparatus for producing sequential pulses upon the receipt of input signals comprising a plurality of stages, each stage including a magnetic core exhibiting bistable states of magnetic remanence, one of which is a reference state, and having a bias winding, a trigger winding, an output winding, and a set winding inductively coupled thereto, a transistor switching device, and an associated load; a plurality of first circuits including the transistor of one stage, the output winding on the core of the same stage, the load associated with the same stage, a set winding on the core of the next succeeding stage connected in a series circuit configuration and with a load potential source; a plurality of second circuits each including a bias potential, a bias winding of one of said stages, and a resistor in series circuit configuration and coupled with the transistor of the same stage for biasing it to a normally non-conductive condition; a third circuit including the trigger windings on each of said stages connected in series circuit configuration; and means for applying a pulse to said third circuit, one of said stages having its core in the non-reference state of remanence being selected and responsive to the pulse applied to said third circuit for switching the core to its reference state, the current induced in the second circuit by the switching of the core in the selected stage to its reference state serving to render the transistor for the selected stage conductive, the current flow in the first circuit for the selected stage due to the conducting transistor serving to complete the switching of the core in the selected stage to its reference state and switching the core of the next succeeding stage from its reference state and provide a drive pulse to the load associated with the selected stage.

References Cited in the file of this patent

UNITED STATES PATENTS

| | | |
|---|---|---|
| 2,785,390 | Rajchman | Mar. 12, 1957 |
| 2,955,264 | Kihn et al. | Oct. 4, 1960 |
| 3,018,389 | Herscher | Jan. 23, 1962 |
| 3,056,115 | Lo | Sept. 25, 1962 |